United States Patent [19]

Nishijima et al.

[11] Patent Number: 4,503,369

[45] Date of Patent: Mar. 5, 1985

[54] POWER SUPPLY FOR PLURAL BRUSHLESS DC MOTORS

[75] Inventors: Hideo Nishijima; Isao Fukushima, both of Katsuta; Tsunehiko Teshima, Mito; Yasunori Kobori; Takayasu Ito, both of Katsuta, all of Japan

[73] Assignee: Hitachi, Ltd., Tokyo, Japan

[21] Appl. No.: 506,896

[22] Filed: Jun. 22, 1983

[30] Foreign Application Priority Data

Jun. 25, 1982 [JP] Japan ................... 57-108401

[51] Int. Cl.³ .............. H02K 29/02; H02P 7/68
[52] U.S. Cl. ....................... 318/254; 318/83; 318/112; 323/267
[58] Field of Search ............ 318/71, 82, 83, 112, 318/254 A, 254, 439; 323/234, 260, 267, 282, 294, 345

[56] References Cited

U.S. PATENT DOCUMENTS 3,866,099  2/1975  Bourbeau ................ 318/138 X
3,911,338  10/1975  Igarashi et al. ............. 318/138

FOREIGN PATENT DOCUMENTS 0155592  12/1980  Japan ..................... 318/254

*Primary Examiner*—J. V. Truhe
*Assistant Examiner*—Bentsu Ro
*Attorney, Agent, or Firm*—Antonelli, Terry & Wands

[57] ABSTRACT

A power supply in which a single variable voltage supply device is used as a power source for a plurality of motors which are simultaneously or successively rotated, in which each motor is subjected to constant current driving by a current control device connected to the motor, and in which the variable voltage supply device is controlled so as to produce a voltage which is the sum of the highest one of the voltages required for driving the motors and necessary and minimum voltage with which all the current control devices are operable.

14 Claims, 8 Drawing Figures

POWER SUPPLY FOR PLURAL BRUSHLESS DC MOTORS

The present invention relates to an electric power supply system for a plurality of motors and drivers therefor.

As an example of conventional power supply circuit for driving a motor for a magnetic recording/reproducing apparatus, such as a video tape recorder, or the like, Japanese Patent Application Laid-open No. 75590/82 filed in the name of Hitachi, Ltd. and laid open on May 12, 1982 discloses such a circuit as shown in FIG. 1. In FIG. 1, a voltage in the form of pulses obtained from an output of a voltage supply source 1 by successively turning a switch 2 on and off is smoothed by a smoothing circuit composed of a diode 3, a choke coil 4 and a capacitor 5 to provide a power source for a brushless motor 24 and a motor driving circuit 27. The motor driving circuit 27 is controlled by an input control signal applied to a terminal 15 so that a desired motor torque can be obtained by suitably changing the input control signal. However, the voltage to be applied to the motor to obtain the desired torque varies depending on the load for the motor 24 and the speed of revolution of the motor.

Accordingly, to obtain the required voltage, the voltage applied to the motor driving circuit 27 is detected by a voltage detecting circuit 26 and the detected signal is negatively fed back to a variable voltage power supply circuit 25. By using a high efficiency switching regulator circuit or the like in the variable voltage power supply circuit 25, a minimum voltage which is sufficiently small but can just satisfy the request by the motor 24 and the motor driving circuit 27, is supplied to the motor 24 and the motor driving circuit 27 to thereby reduce the power losses consumed thereat.

The variable voltage power supply circuit 25 may be a well-known DC-DC converter which may be constituted by a sawtooth generating circuit 6, a comparator 7 having an input supplied with the output of the sawtooth generating circuit 6, and an error amplifier 9 for comparing the output of the voltage detecting circuit 26 with a reference voltage source 8 and for amplifying the difference therebetween.

The motor driving circuit 27 is constituted by a position detector 17 for detecting the rotational potion of a rotor magnet (not-shown) attached to a motor shaft, and a commutator circuit 16 for controlling the conduction period of transistors 18 to 20 which are successively turned on to pass a current into motor driving coils 21 to 23. The amount of current which flows in the conduction period of the transistors 18 to 20 is controlled in response to the control signal applied to the terminal 15 so that the motor driving coils 21 to 23 are driven by a predetermined constant current commanded by this control signal. The lowest one of the collector potentials of the transistors 18 to 20 is detected by diodes 12 to 14 which are biased by a resistor 11 and a reference voltage source 10 and negatively fed back to the variable voltage power supply circuit 25 through the voltage detecting circuit 26.

In the thus arranged circuit, the output of the variable voltage power supply circuit 25 is controlled such that the potential at the common junction of the diodes 12 to 14 is made to be equal to the output voltage of the reference voltage source 8. It is apparent that in order to cause the transistors 18 to 21 to pass a current by the amount commanded by the above-mentioned control signal, the voltage applied across the collector-emitter circuit of the transistors should be within the operative or active region of each transistor. Accordingly, if the output of the reference voltage source 8 is set to the lowest limit voltage (Vr) of the operative voltage region in which all the transistors 18 to 20 can be operable, it is possible to minimize the total power losses consumed in these transistors, while allowing each transistor to draw a predetermined current thereinto.

Diagrams (A) to (D) of FIG. 2 illustrate the collector waveforms of the transistors 18 to 20 when the motor is rotated at a predetermined speed in the circuit attangement as shown in FIG. 1. Reference numeral 33 designates the output voltage of the variable voltage power source circuit 25 and assume now, for the sake of explanation, that the power supply circuit 25 is a constant voltage supply source so that its output voltage is fixed to a constant value as indicated by the reference 33. In each of the waveform diagrams (A) to (D) in FIG. 2, the abscissa represents time and the ordinate the collector-emitter voltage $V_{ce}$ and reference numerals 28 to 30 in the diagrams (A) to (C) designate the collector voltage waveforms of the transistors 18 to 20, respectively. As shown in these diagrams, each collector voltage waveform is approximate to a sinusoidal wave of a frequency proportional to the rotational speed of the motor. Further, each of the waveforms 28 to 30 includes a waveform of voltage drop $V_d$ due to the resistive component included in the respective motor driving coils 21 to 23, during the conductive period of the respective coils 21 to 23. Reference numeral 32 in the diagram (D) in FIG. 2 designates a waveform which has been obtained by plotting, on one and the same time axis, the lowest one of the collector voltage levels every instant on the respective time axes of the collector voltage waveforms of the transistors 18 to 20. At the junction point of the respective anodes of the diodes 18 to 20, a voltage which is the sum of the voltage designated by the reference numeral 32 and the forward voltage drop of the respective diodes appears. Reference numeral 31 designates the output voltage $V_r$ of the reference voltage source 8.

Although it has been assumed in the aforementioned description that the output voltage of the power supply circuit 25 is fixed to a constant value, in the case where the variable voltage power supply circuit 25 as shown in FIG. 1 is used, the power supply circuit 25 produces an output voltage such that the collector voltage which is the lowest level among the three collector voltages at the above-mentioned every instant becomes fixed to the output voltage of the reference voltage source 8 and as a result a necessary minimum voltage is applied to the transistor. If the time $t_1$ is now considered, for example, in FIG. 2(A), the output voltage of the power supply circuit 25 is the sum of the output voltage $V_r$ of the reference voltage source 8 and the voltage $V_c$ applied across the motor driving coil 21. In this case, therefore, the output voltage of the power supply circuit 25 includes a voltage ripple whose component of the frequency is an integer times as large as the frequency of the counter electromotive force induced in the respective coils 21 to 23 as shown in the voltage waveform 32 in FIG. 2(D).

Generally, in many cases, a low-pass filter or the like is provided between the common junction of the diodes 12 to 14 and the input terminal of the error amplifier 9, and in such a case, an output waveform which does not respond to the frequency of the waveform of the counter electromotive force induced in the respective coils 21 to 23 can be obtained from the variable voltage power supply circuit 25.

Conventionally, in such a system as mentioned above, a plurality of variable voltage power supply circuits are employed when a plurality of motors are to be driven. An arrangement for such a case is shown in a block diagram in FIG. 3. In the drawing, the same reference numeral designates the same function as that in FIG. 1. In this case, a motor 37 and a driving circuit 36 for driving the motor 37 is newly required and therefore a variable voltage power supply circuit 34 and a voltage detecting circuit 35 are additionally provided. The additional provision of variable voltage power supply circuits in the number of the additional motors, resulting in a disadvantage that the arrangement becomes expensive.

An object of the present invention is to provide a power supply system in which a single power supply circuit is used for efficiently driving a plurality of motors.

Another object of the present invention is to provide a power supply system for driving a plurality of motors with a simple arrangement.

A further object of the present invention is to provide an inexpensive power supply system for driving a plurality of motors.

According to an aspect of the present invention, the power supply system for driving a plurality of motors is constituted such that when the motors are simultaneously or successively driven at a predetermined rotational speed or a predetermined torque, a single variable voltage power supply circuit is used for supplying the respective motors with power and each of the motors is driven with a constant current by a current control circuit connected to the driving coils of the motor, and such that when the motors are to be rotated at the predetermined rotational speed or torque, the voltage applied to the current control circuit connected to the motor which is supplied with the highest one of the voltages applied to the respective motors is fed back to the power supply circuit to control the output voltage of the power supply circuit such that one of the motors which requires the highest one of the voltages to be applied to the respective motors is supplied with the required voltage and that the minimum voltage necessary for all the constant current driving control circuits to perform their constant current driving operation, that is the lowest limit voltage of the range of the operative voltage of all the current control circuits, is applied to the respective current control circuits.

The above and other objects, features and advantages of the present invention will be apparent from the following detailed description of the preferred embodiments of the invention in conjunction with the accompanying drawings, in which.

Figure 4:
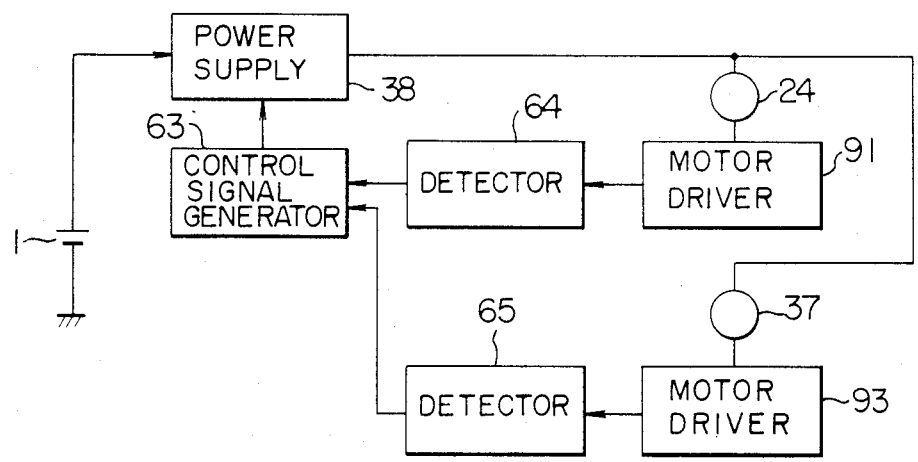
FIG. 4 is a block diagram illustrating an embodiment of the system according to the present invention.
Figure 2:
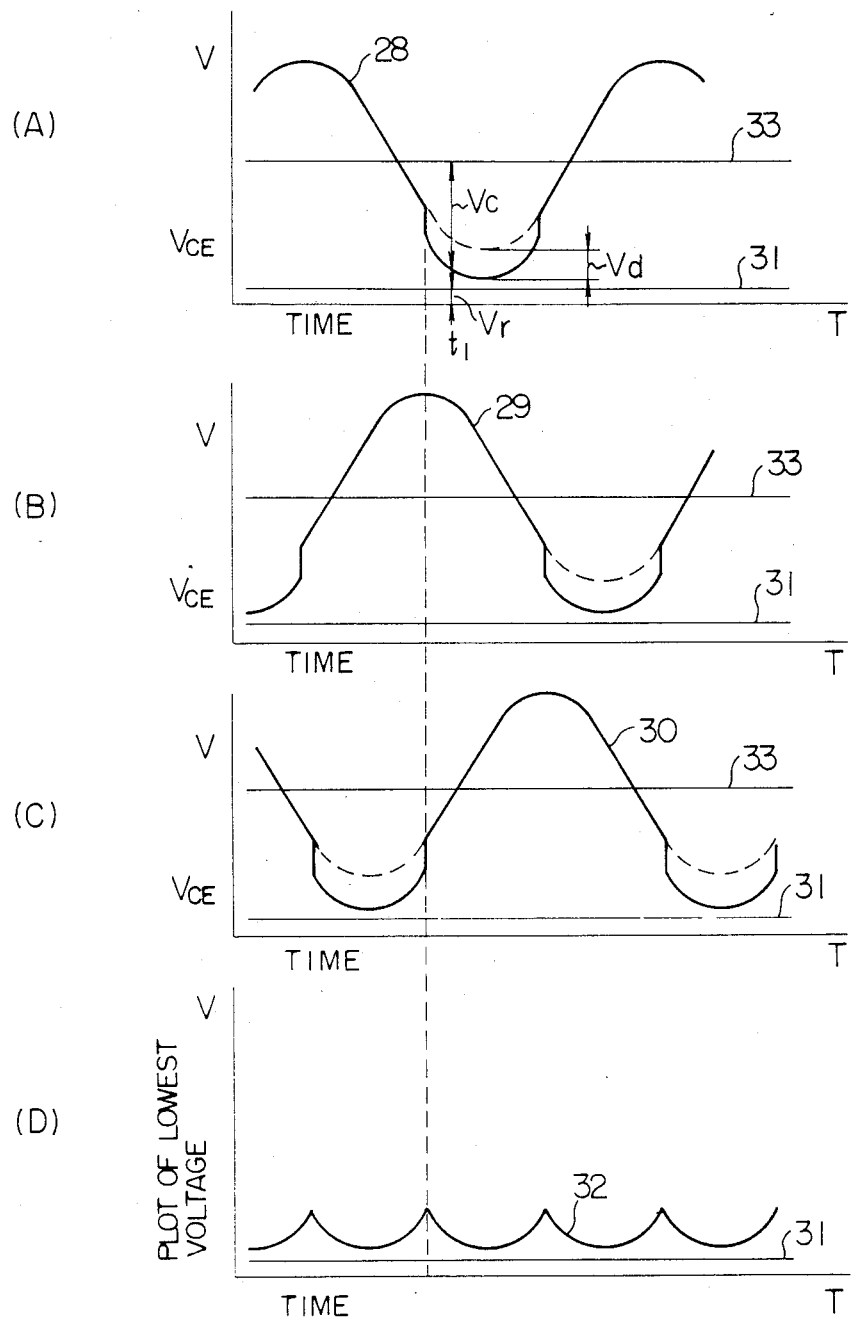
FIG. 2 shows various waveforms in diagrams (A) to (D) for explaining the operation of FIG. 1 arrangement.
Figure 5:
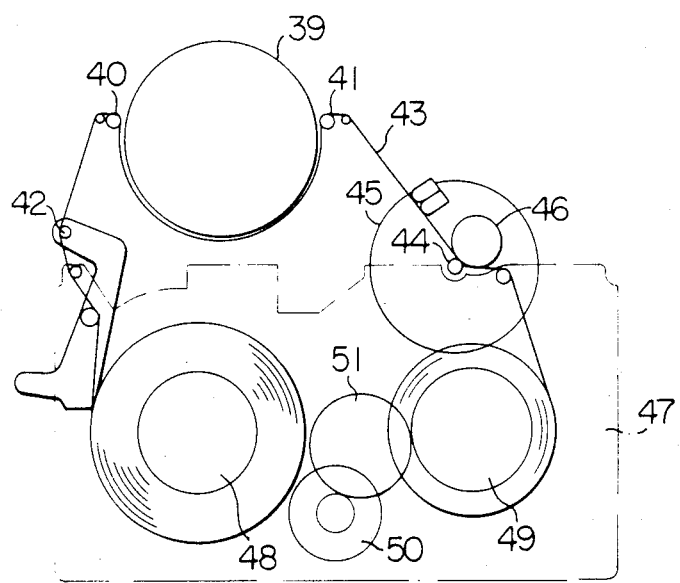
FIG. 5 is a schematic diagram illustrating the mechanism of a magnetic recording/reproducing apparatus to which the system according to the invention is suitably applied.
Figure 6:
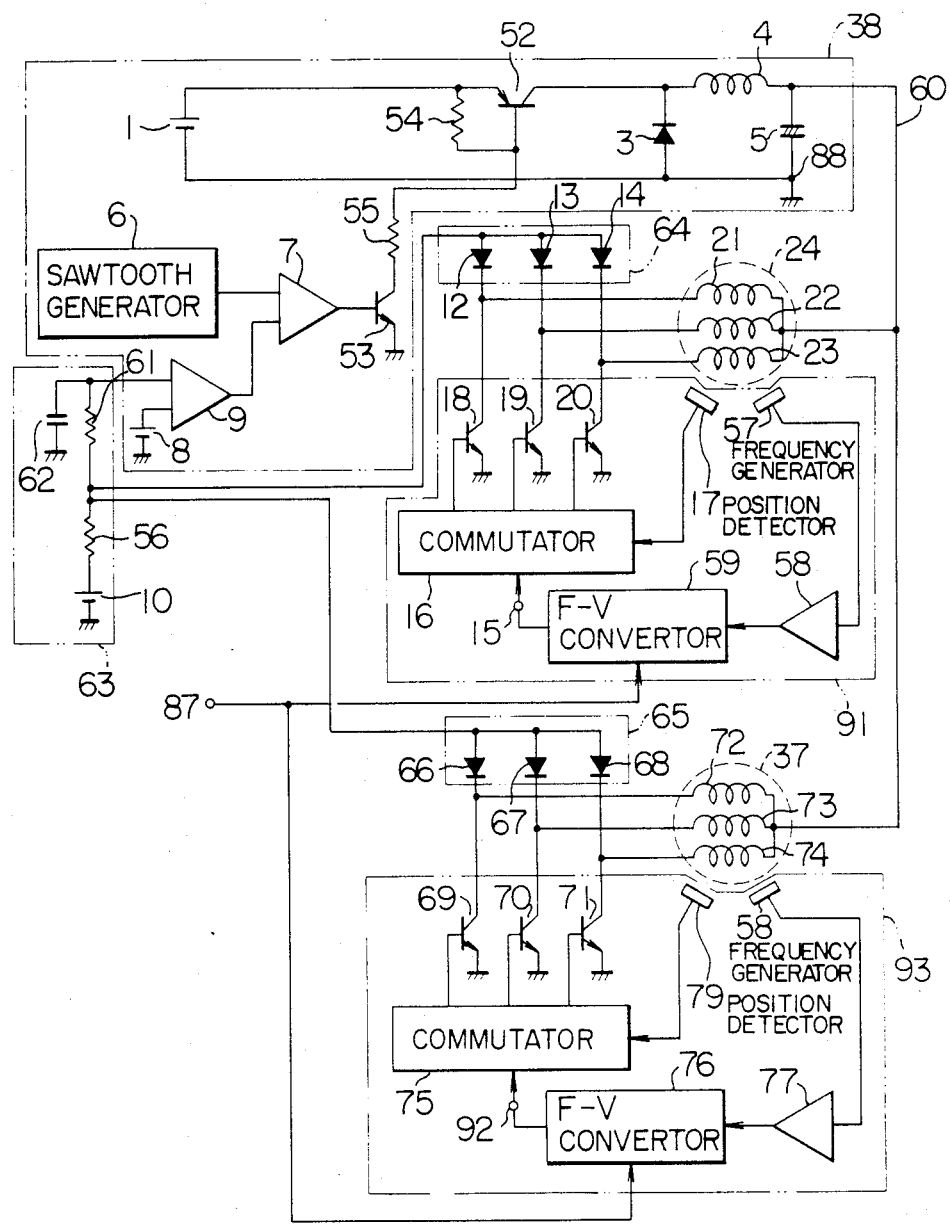
FIG. 6 is a circuit diagram of an embodiment of the present invention.

Referring to FIGS. 4 to 6, an embodiment of the present invention will be now described. FIG. 4 is a block diagram illustrating an example of the present invention, FIG. 5 is a schematic diagram illustrating the arrangement of a magnetic recording/reproducing apparatus to which the present invention is suitably applied, and FIG. 6 is a particular circuit diagram illustrating a preferred embodiment of the present invention.

Figure 1:
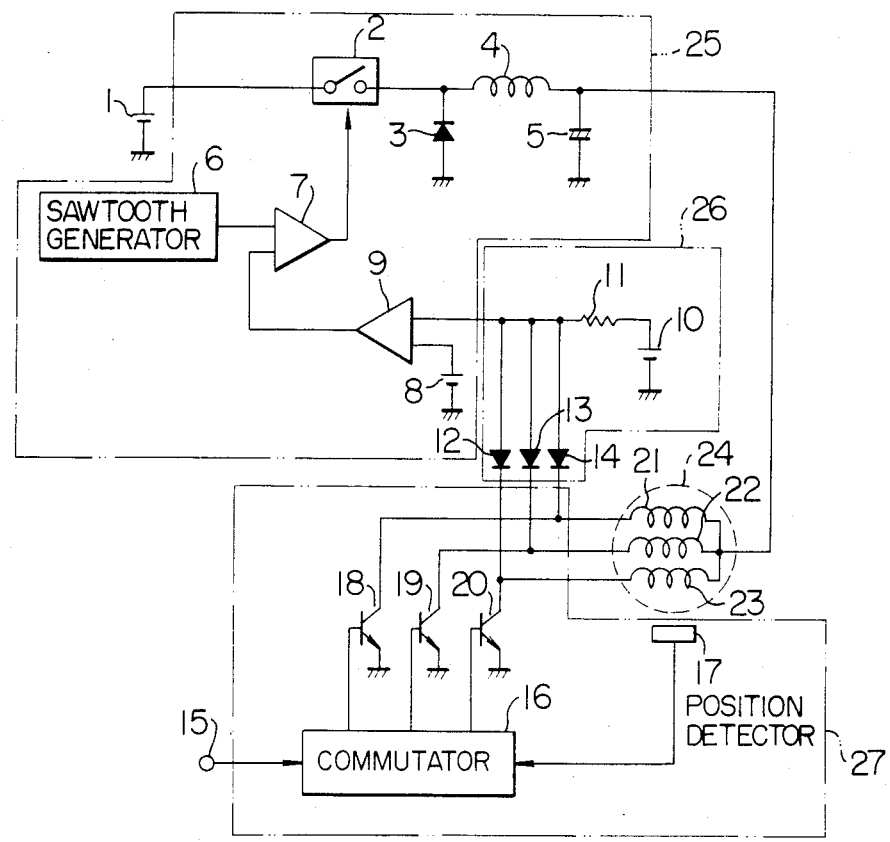
FIG. 1 is a circuit diagram of an example of the conventional motor driving circuit.
Figure 3:
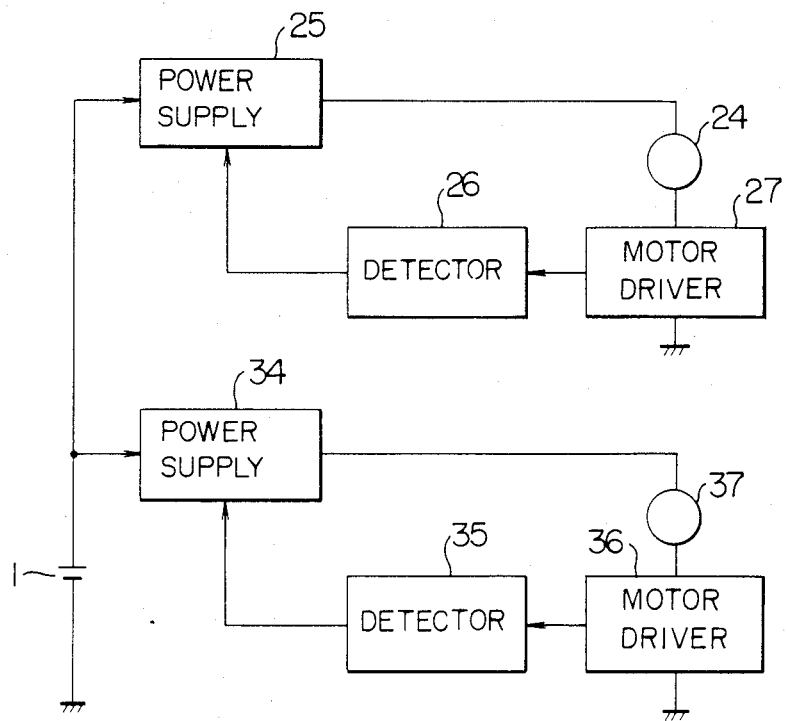
FIG. 3 is a block diagram illustrating another example of the conventional system.

In FIGS. 4 to 6, the same component as that in FIGS. 1 and 3 is attached with the same reference numeral as that used in FIGS. 1 and 3.

In FIG. 4, a pair of a motor 37 and a motor driving circuit or unit 93 connected to the motor 37 are connected in parallel with another pair of a motor 24 and a motor driving circuit or unit 91, and both the pairs are connected to one and the same power supply circuit 38. Voltage detecting circuit 64 and 65 are connected to the motor driving circuits 91 and 93 respectively and both the outputs of the respective voltage detecting circuits 64 and 65 are connected to a control signal generating circuit 63. The output of the control signal generating circuit 63 is connected to the power supply circuit 38. The motors 24 and 37 are subjected to the rotational speed control or output torque control by the motor driving circuits 91 and 93 respectively and each driven with a constant current. The voltages appearing at the motor driving circuits 91, 93 are related to the voltages applied across the motors 24, 37, i.e., they are the difference voltages between the output voltage of the power supply circuit 38 and the voltages applied to the motors 24, 37, respectively. The output of one of the voltage detecting circuits 64 and 65 for detecting the voltages applied to the respective motor driving circuits 91 and 93 is selected or detected by the control signal generating circuit 63 as the output of the voltage detecting circuit (64 or 65) for the motor (24 or 37) which requires a voltage higher than that required for the other motor (37 or 24). That is, the output of the voltage detecting circuit connected to one of the motor driving circuits (91 or 93) which is supplied with a voltage lower than the other (93 or 91) is selected or detected. The thus selected or detected output of the motor driving circuit is supplied to the variable voltage supply circuit 38 as a feedback or control signal thereto. Thus, the output of the variable voltage supply circuit 38 varies in accordance with the voltage request by one of the two pairs of motor and motor driving circuit which require a voltage higher than the other. In this case, the other motor driving circuit which is operable by a voltage lower than that is actually applied shoulders the excessive amount of voltage which would be otherwise supplied to the motor because the motor is driven with a constant current, with the result that the motor is not affected by the deviations in power supply voltage.

Although an embodiment in which the system is provided with two motor driving circuits is illustrated with respect to FIG. 4, it will be easily understood that the same applies to the case where three or more motor driving circuits are used.

The mechanism of a tape running system of a magnetic recording/reproducing apparatus to which the present invention is suitably applied, will be next described by referring to FIG. 5. In FIG. 5, reference numeral 39 designates a rotary cylinder provided with a picture recording/reproducing head; 40 and 41, loading pins; 42, a tension pin; 43, a magnetic tape; 44, a capstan; 45, a capstan motor; 46, a pinch roller; 47, a cassette casing or halves in which the magnetic tape 43 is loaded; 48, a supply reel; 49, a take-up reel; 50, a reel motor; and 51, an idler which may be pressed against the shaft of the reel motor to be thereby rotated to transmit the motor power to the selected one of the supply and take-up reels depending on the direction of revolution by engaging with the selected reel.

The operation will be described. When the cassette casing or halves 47 is loaded and the apparatus is placed in its reproducing mode, the loading pins 40 and 41 which have been so far placed within the cassette halves 47 are moved to the positions as shown in FIG. 5 outside the cassette halves so that the tape 43 is pulled out of the cassette halves 47 and wound around the cylinder 39 so as to be brought in contact with the picture image recording/reproducing head provided on the cylinder.

The tape 43 is pressed against the capstan 44 of the pinch roller 46 so that it is rotated to run on the cylinder 39. In order to take-up the thus driven tape 43 onto the take-up reel 49 with no slack, the reel motor 50 is driven and the idler 51 is pressed to the take-up reel 49 to be rotated to thereby take-up the tape.

In the magnetic recording/reproducing apparatus, variable speed reproducing is generally performed to achieve a plurality of modes, such as a slow operation, a search operation, etc., by changing over the capstan speed. In such a case, the respective speeds of the capstan motor 45 and the reel motor 50 are proportionally changed. When the respective speeds of two motors (capstan motor 45 and the reel motor 50) are changed over proportionally between plural modes, the supply voltages required for the respective motors vary proportionally. It will be easily understood that relatively approximate values of the supply voltages required by the two motors in each of the variable speed reproducing modes can be obtained by suitably designing the motors, for example by suitably designing the strength of the magnetic field of the rotor magnet, the number of turns of the driving coils, etc. The power supply system according to the present invention is suitable to the driving circuits for the thus designed, two motors.

Referring to FIG. 6, a particular embodiment of the above-mentioned case will be described. In FIG. 6, the same reference numeral designates the same function as that in FIGS. 1, 3 and 4. In FIG. 6, reference numeral 38 designates a variable power supply circuit in which the emitter, collector and base of a PNP transistor 52 are connected to the positive output of a power supply source 1, the connection point between one end of a choke coil 4 as well as the cathode of a diode 3, and the collector of an NPN transistor 53 through a resistor 55, respectively. A resistor 54 is inserted between the emitter and base of the transistor 52. The base and emitter of the transistor 53 are connected to the output of a comparator 7 and the ground, respectively. The other end of the choke coil 4 is connected to a positive output line 60 of the variable voltage supply circuit 38. One end of a capacitor 5 is connected to the other end of the choke coil 4. The anode of the diode 3 and the other end of the capacitor 5 are commonly connected to the negative output line 88 of the variable voltage power supply circuit 38. One and the other inputs of the comparator 7 are connected to the output of a sawtooth generator 6 and the output of an error amplifier 9 respectively. One of two inputs of the error amplifier 9 is connected to the positive output of a reference voltage source 8.

A motor 24 has three driving coils 21 to 23 which are commonly connected at their one ends to the positive output line 60 of the variable voltage supply circuit 38. The other ends of the driving coils 21 to 23 are respectively connected to the collectors of transistors 18 to 20 in a motor driving circuit 91. The respective emitters of the transistors 18 to 20 are commonly connected to the negative output line 88 and the respective bases of the same transistors are connected to a commutator circuit 16. A position detector 17 and a frequency generator 57 both provided on the motor are connected to the commutator circuit 16 and the input of an amplifier 58 respectively. The output of the amplifier 58 is connected to a terminal 15 of the commutator circuit 16 through a frequency-voltage converter 59. Diodes 12 to 14 constitute a voltage detecting circuit 64. The cathodes of the diodes 12 to 14 are connected to the collectors of the transistors 18 to 20 respectively, while the anodes of the same diodes are commonly connected to each other.

The circuit arrangement associated with a motor 37 is quite the same as the above-mentioned arrangement with respect to the motor 24. That is, the motor 37 has three driving coils 72 to 74 and the respective one ends of the coils 72 to 74 are commonly connected to the positive output line 60 of the variable voltage supply circuit 38. The other ends of the driving coils 72 to 74 are respectively connected to the collectors of transistors 69 to 71 of a motor driving circuit 36. The respective emitters of the transistors 69 to 71 are commonly connected to the negative output line 88 and the respective bases of the same transistors are connected to a commutator circuit 75. A position detector 79 and a frequency generator 78 both provided on the motor 37 are connected to the commutator circuit 75 and the input of an amplifier 77 respectively. The output of the amplifier 77 is connected to a terminal 92 of the commutator circuit 75 through a frequency-voltage converter 76. Diodes 66 to 68 constitute another voltage detecting circuit 65. The cathodes of the diodes 66 to 68 are connected to the collectors of the transistors 69 to 71 respectively, while the anodes of the same diodes are commonly connected to each other.

The common connection point of the anodes of the diodes 12 to 14 constituting the voltage detecting circuit 64 is connected to the junction between the respective one ends of resistors 56 and 61 which constitute a control signal generating circuit 63 together with a voltage source 10 and a capacitor 62. The common connection point of the anodes of the diodes 66 to 68 constituting the other voltage detecting circuit 65 is connected to the same junction between the resistors 56 and 61 of the control signal generating circuit 63.

In the control signal generating circuit 63, the other end of the resistor 56 is connected to the positive output of the voltage source 10 and the other end of the resistor 61 is connected to one end of the capacitor 62. The other end of the capacitor 62 is connected to the ground, that is, the negative output of the voltage source 10. The junction point between the resistor 61 and the capacitor 62 is connected to the other input terminal of the error amplifier 9. An input terminal 87 is connected to a mode change-over input of each of the frequency-voltage converter 59 and 76.

The motors 24 and 37 respectively correspond to the capstan motor 45 and the reel motor 50 of FIG. 5.

In operation, the transistor 52 in the variable voltage supply circuit 38 corresponds to the switch 2 in FIG. 1 and intermittently supplies the voltage of the supply source 1 to the choke coil 4 in response to the output pulse of the comparator 7. The resistor 54 is for providing the base current bias for the transistor 52 so as to improve the switching characteristic of the transistor 52. The resistor 55 limits the base current of the transistor 52. The transistor 53 receives the output of the comparator 7 and drives the transistor 52. The output voltage of the variable voltage supply circuit 38 is determined such that the difference between the output voltage of the reference voltage source 8 connected to the one input of the error amplifier 9 and the applied voltage to the other input of the same error amplifier 9 is made to be zero. Since the explanation made above with respect to FIG. 1 also applies to the operation of the variable voltage supply circuit 38 and since the operation of such a DC-DC converter is generally well known, further description with respect to the operation is omitted here.

In this embodiment, a velocity control loop is provided to which a signal indicating the rotational speed of the motor is inputted as a control signal for the motor. The frequency generator 57 produces a signal of a frequency corresponding to the rotational speed of the motor 24. The thus produced signal is applied to the amplifier 58 and amplified thereat. The amplified signal is then applied to the frequency-voltage converter 59 which converts the amplified signal into a DC voltage corresponding to the frequency of the signal. This DC voltage may be shifted by a predetermined value by changing over the motor speed changing-over signal applied to the frequency-voltage converter 59. That is, the signal inputted to an input terminal 87 is changed over to change-over the motor speed to thereby set a variable speed reproducing mode, such as a slow mode, a search mode, etc. In accordance with the voltage signal produced from the frequency-voltage converter 59, the current flowing in the respective driving coils 21 to 23 of the motor 24 is controlled so that the motor 24 rotates at a predetermined rotational speed. The frequency-voltage converter 59 may be, for example, such a type as disclosed in U.S. Pat. No. 4,338,554, assigned to Hitachi Ltd., and issued June 6, 1982 to Isao Fukushima et al. (corresponding to Japanese Patent Laid-open No. 144788/80 laid open on Nov. 11, 1980).

With respect to the motor 37, the accompanying arrangement is similar to that provided as to the motor 24 so that the description made above about the motor 24 applies to the motor 37, and therefore the description about the latter being omitted.

In order to detect the voltage applied to each motor, the respective anodes of the diodes 12 to 14 and the respective anodes of the diodes 66 to 68 are commonly connected and the respective cathodes of the diodes 12 to 14 and the respective cathodes of the diodes 66 to 68 are connected to the respective collectors of the transistors 18 to 20 and the respective collectors of the transistors 69 to 71 so as to detect the lowest one of the voltages at the respective cathodes to thereby indirectly detect the voltage applied to each motor and the detected value is applied as a detected output to the error amplifier 9. In the drawing, as described above, there is provided a low-pass filter constituted by the resistor 61 and the capacitor 62. The common connection of the respective anodes of the diodes 12 to 14 and the respective anodes of the diodes 66 to 68 is connected to the voltage source 10 through the resistor 56 so as to allow the conduction of only one of the diodes connected to one of the transistors 18 to 20 and 69 to 71, the voltage appearing at the collector of the one transistor being the lowest one among the voltages appearing at the respective collectors of all the transistors. It should be understood that the voltage level at the cathode of the above one diode in the conducting state is related to both the voltage applied across the corresponding driving coil and the voltage appearing at the collector of the transistor connected thereto. Thus, detected is the voltage which is related to the voltage applied to one of the motors and which is the highest one of the respective voltages applied to all the motors, more accurately the voltage which is the lowest one among the voltages applied to the respective transistors 18 to 20 and 69 to 71 for driving the respective motors 24 and 37. Preferably, the voltage value of the reference voltage source 8 is determined to the lowest limit of the range of the collector-emitter voltage, that is, the lowest limit of the operative voltage region, in which each of the transistors 18 to 20 and 69 to 71 can cause a sufficient amount of current to pass through each driving coil in each variable speed reproducing mode. The output voltage of the variable voltage supply circuit 38 is controlled such that the collector voltage of the transistor which is detected as the lowest one of the collector voltages as described above is made equal to the reference voltage. That is, the variable voltage supply circuit 38 produces a voltage which is made equal to the sum voltage of the highest one of the voltages required by the respective motors and the reference voltage.

As described above, the transistors for driving each motor, for example the transistors 18 to 20, are always driven with a constant current in accordance with the output of the frequency-voltage converter without being saturated.

As shown in FIG. 5, the capstan motor 45 and the reel motor 50 are coupled by the tape 43 so that the respective speeds of the motors vary proportionally, for example, in the variable speed reproducing mode. Accordingly, the voltages required by the respective motors also vary similarly to the motor speed so that even if the power source line is made common by properly designing the motors, the power losses in the motor driving circuit are relatively small.

Thus, the present invention is particularly effective in the case where a plurality of motors vary in their speed in the same direction in each mode.

It is a matter of course that a further motor may be provided which is supplied by the abovementioned power supply source and driven in the driving manner different from that described above.

Figure 7:
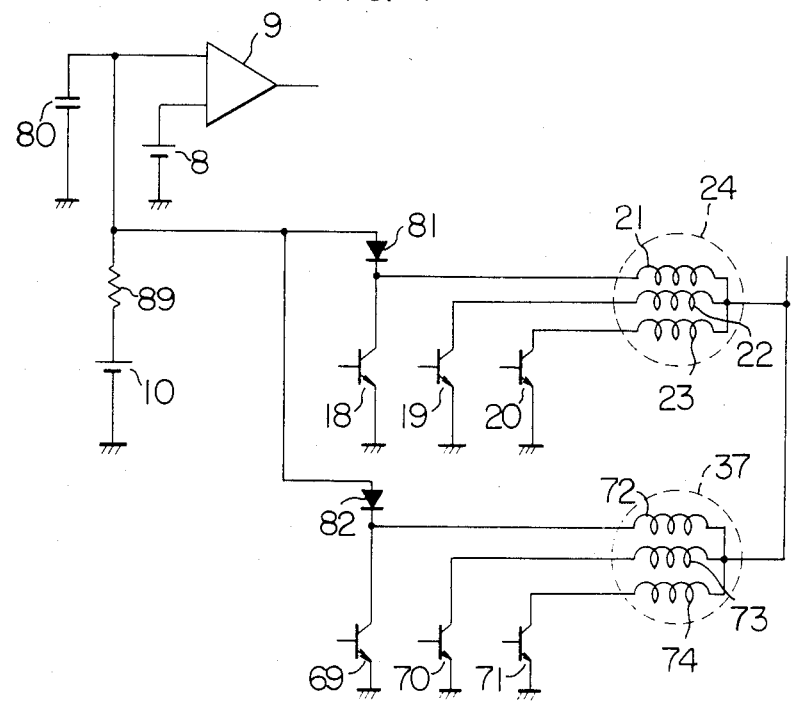
FIG. 7 is a circuit diagram of an embodiment of the detecting circuit in the system according to the present invention.

FIG. 7 illustrates another embodiment of the present invention, in which only the related portions are depicted and the other portions which are the same as those in FIG. 6 are omitted therefrom. The same component is attached with the same reference numeral as used in FIG. 6. In this embodiment, each voltage detecting circuit is constituted by a single diode. That is, with respect to a motor 24, the cathode of a diode 81 is connected to a transistor 18 and with respect to another motor 37, the cathode of a diode 82 is connected to the collector of a transistor 69. The respective anodes of the diodes 81 and 82 are connected to each other. A resistor 89 is connected at its one end to the positive output of a voltage source 10 and at its other end to one end of a capacitor 80. The junction point between the resistor 89 and the capacitor 80 is connected to one input of an error amplifier 9. This arrangement is a so-called low voltage detector arrangement in which one diode (81 or 82) which is connected to the transistor (18 or 69) whoes collector voltage is lower than the other is conducted, and, the voltage across the capacitor is clamped to the lowest voltage value in the conduction period of the conducted diode at its cathode. The variable voltage supply circuit 38 can be controlled to produce a proper output by suitably selecting the time constant determined by the resistor 89 and the capacitor 80 and voltage of the reference voltage source 8. In this case, each of the voltage detecting circuits can be constituted by a single diode with an advantage that the power supply system can be provided simply and inexpensively.

Figure 8:
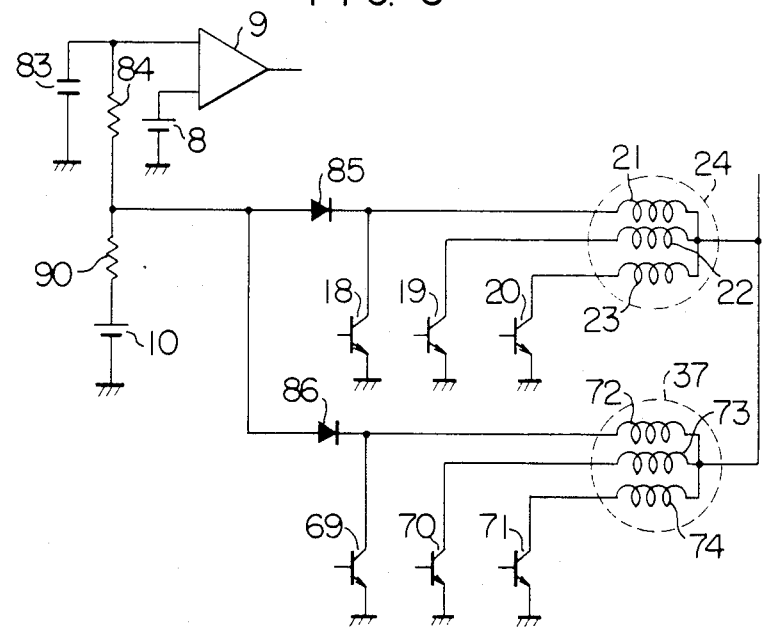
FIG. 8 is a circuit diagram of another embodiment of the detecting circuit in the system according to the present invention.

FIG. 8 illustrates a further embodiment of the present invention, in which only the related portions are depicted and the other portions which are the same as those in FIG. 6 are omitted therefrom. The same component is attached with the same reference numeral as used in FIG. 6. Also in this embodiment, the detection of the collector voltage of the transistors for driving each motor is performed only by a single diode. The respective cathodes of diodes 85 and 86 are connected to the collector of a transistor 18 for a motor 24 and the collector of a transistor 69 for a motor 37, respectively. The respective anodes of the diodes 85 and 86 are connected to each other. A resistor 90 is connected at its one end to the positive output of a voltage source 10 and at its other end to the connection between the anodes of the diodes 85 and 86 as well as one end of a resistor 84. The other end of the resistor 84 is connected to one end of a capacitor 83. The other end of the capacitor 83 is connected to the ground, that is, the negative output of the voltage source 10. The junction point between the resistor 84 and the capacitor 83 is connected to one input of an error amplifier 9. In this case, the resistor 84 and the capacitor 83 constitute a low-pass filter and, preferably, the time constant of the low-pass filter is selected to be three times or more as large as the period of the counter electromotive force induced in the motor. The variable voltage supply circuit 38 can be controlled to produce a proper output by suitably selecting the output voltage of the reference voltage source 8.

As described above, according to the present invention, a plurality of motors are supplied with power by a single commonly-provided variable voltage supply circuit, resulting in advantages that the system is superior in economy and expected to reduce power losses in the motor driving circuit with effective power saving.

We claim:

1. A power supply for a plurality of motors each including a plurality of motor driving coils, said power supply comprising:
a variable voltage supply device for supplying a voltage to said plurality of driving coils of each of said plurality of motors;
a plurality of motor driving units provided respectively correspondingly for said plurality of motors, each of said motor driving units being connected between said variable voltage supply device and said plurality of motor driving coils of an associated one of said motors so as to cause the associated motor to rotate under a predetermined rotational condition, each of at least two of said plurality of motor driving units including, (a) a plurality of current control devices respectively connected to said plurality of motor driving coils of the motor associated with the motor driving unit for controlling currents to be passed respectively through said motor driving coils, (b) a commutator device connected to said plurality of current control devices for controlling the conduction period and amplitude of each of the currents flowing through said current control devices, and (c) a detecting device for detecting a signal related to both a voltage value applied to said plurality of motor driving coils of the associated motor and a voltage value appearing at said current control devices connected to said motor driving coils; and
a control signal generating device for selecting one of signals detected by the respective detecting devices of said at least two motor driving units, said selected one signal corresponding to the motor driving coils of one of said motors which requires the highest one of the voltages required by the plurality of motor driving coils of said respective motors, said control signal generating device producing a control signal on the basis of said selected one of said detected signals,
said variable voltage supply device including a reference voltage means for providing a reference voltage, a comparator means for comparing a voltage of said control signal with said reference voltage, and a control means responsive to an output of said comparator means for controlling an output voltage of said variable voltage supply device.

2. A power supply according to claim 1, in which each of said plurality of current control devices includes at least one transistor, the collector and the emitter thereof being connected between an associated one of said motor driving coils and said power supply, the base thereof being connected to said commutator device.

3. A power supply according to claim 2, in which said reference voltage is predetermined to be equal to the lowest limit voltage in the operative voltage range in which all of said transistors connected to said motor driving coils of each of said at least two motor driving units are operable.

4. A power supply according to claim 3, in which the detecting device of each of said at least two motor driving units comprises a plurality of diodes, a cathode of each of said plurality of diodes in each of the detecting devices being connected to a different connection point of said transistors and said plurality motor driving coils of the associated motor, the anodes of said plurality of diodes in each of the detecting devices being connected to each other.

5. A power supply according to claim 4, in which said control signal generating device comprises a voltage source and a resistor connected at its one end to said voltage source and at the other end to an input of said comparator means as well as to the connection point of said plurality of anodes of the detecting device in each of said at least two motor driving units.

6. A power supply according to claim 5, in which said control signal generating device further comprises a low-pass filter means for filtering said selected one of said detected signals to produce a filtered signal, said control signal generating device producing said control signal on the basis of said filtered signal.

7. A power supply according to claim 6, in which said low-pass filter means comprises at least one resistor and at least one capacitor.

8. A power supply according to claim 3, in which said detecting device of each of said at least two motor driving units includes a diode with its cathode connected to a given one of said transistors and the anodes thereof connected to each other.

9. A power supply according to claim 8, in which said control signal generating device comprises a low level detector.

10. A power supply according to claim 9, in which said low level detector comprises a voltage source, a resistor connected at its one end to the positive pole of said voltage source and connected at its other end to the anode of said diode of said detecting device of each of said motor driving units, and a capacitor connected at its one end to the other end of said resistor and connected at its other end to the negative pole of said voltage source, whereby said control signal is produced from the other end of said resistor.

11. A power supply according to claim 8, in which said control signal generating device comprises a voltage source, a first resistor connected at its one end to the positive pole of said voltage source and connected at its other end to the anodes of said diodes, a capacitor, and a second resistor, said second resistor being connected at its one end to the other end of said first resistor and connected at its other end to one end of said capacitor, said capacitor being connected at its other end to the negative pole of said voltage source, said control signal being produced from the connection point between the other end of said second resistor and the one end of said capacitor, said second resistor and said capacitor being selected to provide a time constant having a value three times or more as large as the period of counter electromotive force induced in said motor driving coils.

12. A power supply according to claim 11, in which two motors connected to said at least two motor driving units include a reel motor for driving a supply reel and a take-up reel in a magnetic recording/reproducing apparatus and a capstan motor engaged with a magnetic tape at an intermediate portion between said supply and take-up reels for controlling the feed speed of said magnetic tape.

13. A power supply according to claim 12, in which said variable voltage supply device includes a DC-DC converter.

14. A power supply for a plurality of motors comprising:
a single variable voltage supply device, including an output voltage control loop, for supplying a voltage to said plurality of motors;
a plurality of motor driving units respectively correspondingly connected in series with said plurality of motors for driving said motors, said voltage being applied to each of the series connections of said plurality of motors and motor driving units;
at least two detecting devices respectively connected to at least two of said plurality of motor driving units, each for detecting a signal related to both a voltage value applied to the motor driven by the associated motor driving unit and a voltage value applied to said associated motor driving unit; and
a control signal generating device responsive to the detected signals from said at least two detecting devices for producing a control signal corresponding to one of the at least two of said motors connected to said at least two motor driving units,
said variable voltage supply device being controlled by said output voltage control loop in accordance with said control signal so as to produce a voltage which is the sum of a voltage applied to one of said at least two motors which requires a voltage higher than the other and the lowest limit voltage in the operative voltage region in which said at least two motor driving units are operable.

* * * * *